United States Patent
Rogers, Jr.

[15] 3,642,567
[45] Feb. 15, 1972

[54] NOVEL COMPOSITE ARTICLE AND METHOD FOR THE PROTECTION OF ARTICLES OF COMMERCE

[72] Inventor: William A. Rogers, Jr., Lake Jackson, Tex.

[73] Assignee: The Dow-Chemical Company, Midland, Mich.

[22] Filed: Nov. 21, 1969

[21] Appl. No.: 878,902

[52] U.S. Cl. .................161/165, 117/3.5, 117/6, 117/122 PF, 117/122 S, 156/247, 156/331, 161/167, 161/216, 161/219, 161/247, 296/136
[51] Int. Cl. ..................B32b 15/08, B60j 7/10, C09j 7/02
[58] Field of Search ................117/122 PF, 122 S, 6, 3.5; 156/247, 331; 161/167, 216, 247, 213, 165, 219; 296/136

[56] References Cited

UNITED STATES PATENTS

| | | | |
|---|---|---|---|
| 2,558,803 | 7/1951 | Wittgren | 117/3.4 |
| 2,828,237 | 3/1958 | Rosser | 53/33 |
| 2,999,782 | 9/1961 | Justice et al. | 161/249 |
| 3,140,196 | 7/1964 | Lacy et al. | 117/75 |
| 3,423,225 | 1/1969 | Coney et al. | 117/6 |

*Primary Examiner*—Harold Ansher
*Assistant Examiner*—Robert A. Dawson
*Attorney*—Griswold & Burdick and Raymond B. Ledlie

[57] ABSTRACT

A novel composite article protected from the forces of nature and manmade hazards, during exposure to outdoor weather. The novel article comprising a weather resistant film adhered to the surface of an article of commerce with a water-soluble adhesive and having the characteristics of ease of application, maximum weather resistance and ease of removal. A method for the protection of articles of commerce which comprises adhering a weather resistant film to the surface of the article with a water-soluble adhesive for protection from outdoor weather and removal of the film and adhesive with water when protection is no longer desired.

4 Claims, No Drawings

NOVEL COMPOSITE ARTICLE AND METHOD FOR THE PROTECTION OF ARTICLES OF COMMERCE

BACKGROUND OF THE INVENTION

For years the manufacturers of machines, equipment, vehicles and other articles of commerce have been plagued with the problem of protecting their products from the forces of nature and manmade hazards prior to these products being offered to the consumer. Manufacturers have experienced many problems in keeping their new products in topnotch conditions while transporting them by open-air means of conveyance, i.e., flat bed trucks, flat bed train cars, vehicle trailers, and piggyback train cars. During transportation, the new articles of commerce are exposed to various atmospheric conditions, i.e., rain, snow, ice, and hail. Also, the new articles are subject to being damaged by road grime, dust, and tar. Further, many such articles are stored out-of-doors exposing them to the various corrosive and damaging conditions of the out-of-doors. A vital need for protecting such articles of commerce has arisen to allow the manufacturer to deliver its new products to the ultimate consumer in the same topnotch condition in which it finds itself at the factory.

Attempts have been made to cover these products with waxes and the like, but none of the prior attempts have provided manufacturers with a protective covering which combines all the characteristics of the present invention, i.e., ease of application, maximum weather resistance and ease of removal. Previous protective coverings require many more manhours spent in application and removal than the present invention. Previous attempts have experienced the problem of being easily washed off by a rainstorm while in transit or while stored out-of-doors. Prior coverings which overcome the problem of weather resistance have experienced great difficulty in removal, thus offsetting the gained protection by increased labor expense in time spent and materials used for removal. Difficulties in removal, also, present the problem of marring the finish of the article which cancels out what protection has been gained by the covering.

SUMMARY OF THE INVENTION

This invention relates to a novel method for the protection of articles of commerce exposed to the forces of nature and manmade hazards for extended periods of time, i.e., vehicles in transit from the manufacturer to the distributorships, storage of vehicles and other equipment in the out-of-doors, and use of equipment in an area of high corrosiveness. It further relates to a composite article protected against exposure to weather and the like.

It is the object of this invention to provide the art with a new composite article that can easily be cleaned when the protection offered by the covering is no longer desired. A further object of this invention is to provide the art with a novel composite article possessing physical properties enabling it to be resistant to all types of weather conditions without losing its protective ability. Also, a further object of this invention is to provide the art with a novel composite article capable of quick and easy clean up without marring of the finish of the article. Also, it is the object of this invention to provide the art with a novel method for the protection of articles of commerce. The present invention has the advantage of quick and simple application and ease of removal over prior attempts in the art to obtain similar protection. These and other objects and advantages of the present invention will become apparent from a reading of the following description.

It has now been discovered that by adhering on the surface of the article of commerce a weather resistant film with a water-soluble adhesive, a novel composite article exhibiting excellent weather resistant properties and having ease of removal is achieved for the first time. The novel composite articles of the present invention exhibit such properties that make them suitable for being employed with many types of articles of commerce.

The novel composite articles may be prepared by adhering the weather resistant film to the substrates in various ways, e.g., spreading the water-soluble adhesive on the surface of the article then placing the weather resistant film onto the adhesive, spreading the water-soluble adhesive onto one surface of the weather resistant film and then placing the coated surface of the film on the article surface, and spreading the water-soluble adhesive onto the surface of the article at points of critical contact then placing the film onto the surface of the article thereby adhering the film to the surface of the article at the critical points of contact. In addition, a tape having both sides thereof coated with water-soluble adhesive can be placed on the surface of the article and then the film placed over the article adhering to the double-sided tape.

The novel composite articles are quickly and easily cleaned by simply applying water to the water-soluble adhesive. When the water comes into contact with the water-soluble adhesive it loses its grip on the film and on the surface of the article, thereby allowing the covering to be simply lifted off of the article. In some instances, the protective film can be ripped off the article and the residual adhesive removed with water.

PREFERRED EMBODIMENTS

The water-soluble adhesive of the present invention must possess the ability to adhere to the surface of the body protected and to adhere to the weather resistant film placed thereon which is exposed to various atmospheric conditions for extended periods of time.

There are numerous articles of commerce which can be protected by the present invention. Such suitable articles of commerce contemplated within the scope of this invention are, just to name a few, automobiles, trucks, farm equipment, machinery and the like.

Suitable water-soluble adhesives for use in the present invention include natural products such as casein, gum, pastes, etc.; polyvinyl methyl ether, dextrin, polyvinyl alcohol, starch, and preferably polyethylenimines.

Suitable weather resistant films for use in the invention include polyvinyl chloride copolymers, polystyrenes, polypropylenes, polycarbonates, polyesters such as polyethylene terephthalate, and the like and preferably polyethylene and ethylene copolymer films.

The weather resistant films of the present invention should be prepared with a thickness of from between about ½ to about 20 mils and preferably between about 1 to about 5 mils.

The present invention contemplates the preparation of the weather resistant film and the water soluble adhesive by known methods.

In one preferred embodiment of the present invention, an article of commerce, such as an automobile, is at least partially coated, prior to shipment, with a water-soluble adhesive, such as polyethylenimine; subsequent to being coated the automobile is covered with a weather resistant film, such as polyethylene, having a thickness of about 5 mils. The polyethylene film is thereby adhered to the surface of the automobile to give maximum protection from adverse conditions while in transit. Upon reaching its destination, the polyethylenimine is contacted with water which acts thereon and facilitates easy removal of both the adhesive and the film.

It should be fully understood that the foregoing is intended to be merely illustrative and that other weather resistant films and other suitable water-soluble adhesives may be employed in the practice of the invention.

I claim:

1. An automobile protected from exposure to the forces of nature and manmade hazards with a weather resistant film selected from the group consisting of a polyethylene film and an ethylene copolymer film, said film having a thickness of from about ½ to about 20 mils and adhered with a water soluble polyethylenimine to the surface of said automobile.

2. The automobile of claim 1 wherein the film is a polyethylene film.

3. The automobile of claim 2 wherein the film has a thickness from about 1 to about 5 mils.

4. The automobile of claim 3 wherein the film has a thickness of about 5 mils.

* * * * *